United States Patent [19]
Ring

[11] 4,057,005
[45] Nov. 8, 1977

[54] DUAL FLOW HYDRAULIC SYSTEM AND CONTROL VALVE THEREFOR

[75] Inventor: Curtis Phillip Ring, Cedar Falls, Iowa

[73] Assignee: Deere & Company, Moline, Ill.

[21] Appl. No.: 612,631

[22] Filed: Sept. 12, 1975

[51] Int. Cl.² .................................................. F15B 11/16
[52] U.S. Cl. ........................................... 91/413; 91/414; 91/465; 137/625.18; 137/625.69; 137/596
[58] Field of Search .................... 91/411 R, 413, 465, 91/414; 137/596, 625.18, 625.67, 625.69

[56] References Cited

U.S. PATENT DOCUMENTS

| Re. 28,520 | 8/1975 | Mahorney | 137/596 |
|---|---|---|---|
| 671,783 | 4/1901 | Speirs | 91/411 R |
| 884,096 | 4/1908 | Leach | 91/411 R |
| 980,106 | 12/1910 | Lentz | 91/413 |
| 997,627 | 7/1911 | Lindholm | 91/413 |
| 2,953,164 | 9/1960 | Haberland | 91/413 |
| 3,002,498 | 10/1961 | Quayle | 91/413 |
| 3,044,491 | 7/1962 | Sangster | 137/625.18 |
| 3,199,538 | 8/1965 | Anthon | 137/625.18 |
| 3,234,856 | 2/1966 | Martin | 91/413 |
| 3,520,230 | 7/1970 | Orloff | 91/413 |
| 3,580,284 | 5/1971 | Bini | 137/625.18 |
| 3,698,435 | 10/1972 | Evans | 137/625.69 |
| 3,937,253 | 2/1976 | Lilja | 137/625.18 |

*Primary Examiner*—Martin P. Schwadron
*Assistant Examiner*—Abraham Hershkovitz

[57] ABSTRACT

A hydraulic system with a valve for controlling fluid flow to the two reversible hydraulic wheel motors in a hydrostatic drive vehicle includes a pair of valve spools axially slidable in bores in a valve body. Each spool has a pair of opposed notches. In one position of the spool, the notches provide separate paths for dual input flows to each of two passages to the wheel motors which differentially lock the wheel motors. In a second position, the notches act to exhaust the return flows in two passages to a single exhaust.

6 Claims, 3 Drawing Figures

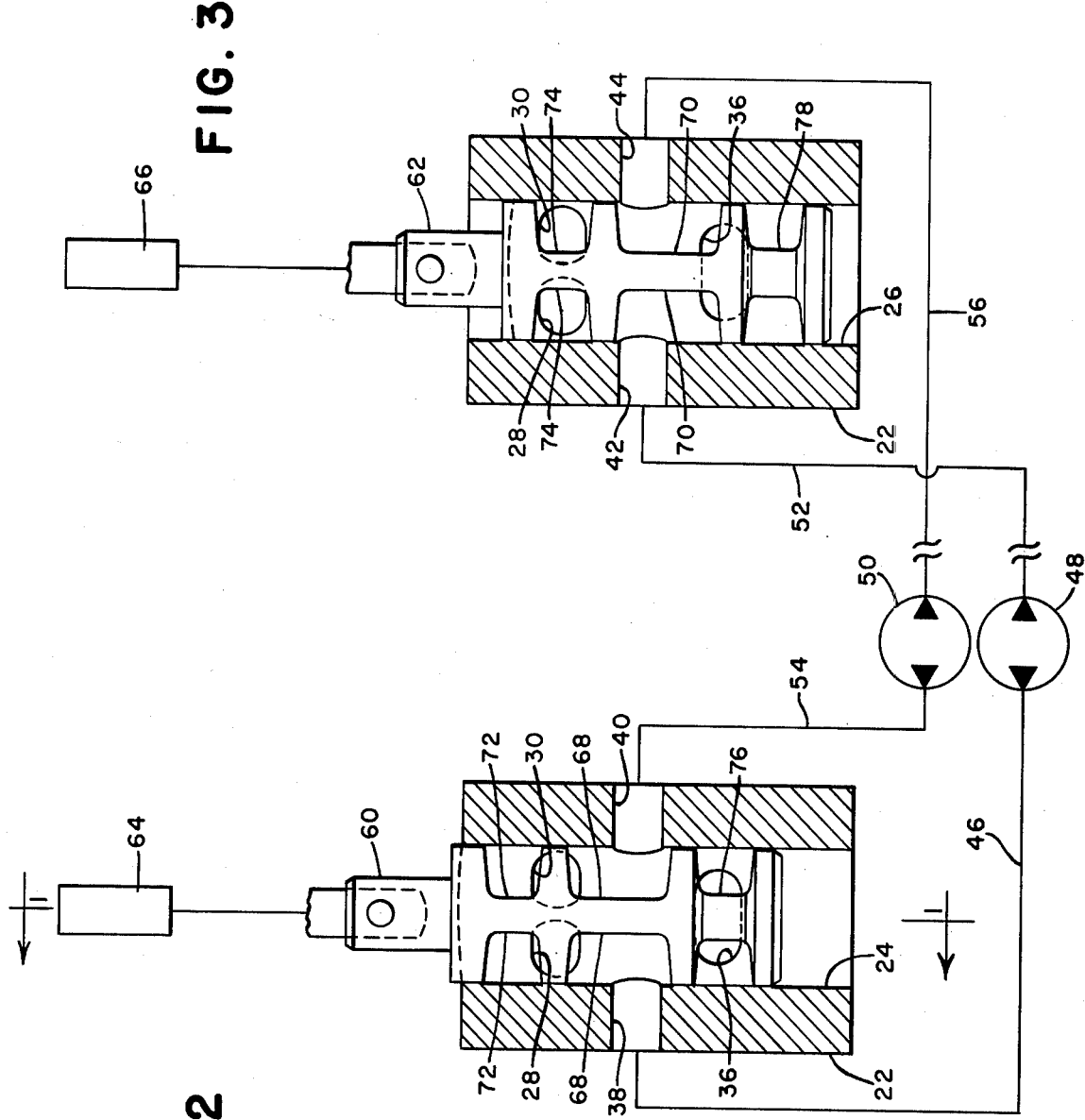

DUAL FLOW HYDRAULIC SYSTEM AND CONTROL VALVE THEREFOR

BACKGROUND OF THE INVENTION

The present invention relates generally to fluid control systems and more particularly to a control valve which is capable of maintaining dual flow from dual input to two functions with a single valve spool.

SUMMARY OF THE INVENTION

The present invention provides a control valve which is capable of maintaining dual flow from dual inputs to dual functions with a single spool.

The above and additional objects and advantages of the present invention will become apparant to those skilled in the art from a consideration of the following detailed description of the preferred embodiment when taken in conjunction with the accompanying drawings.

BRIEF DESCRIPTION OF THE DRAWINGS

FIG. 2 is a schematic and sectional view showing a further portion of the hydraulic control system in schematic and the control valve of the present invention in a sectional view taken along line 2—2 of FIG. 1; and FIG. 3 i a schematic and sectional view showing a still further portion of the hydraulic control system in schematic and the control valve of the present invention in a sectional view taken along line 3—3 of FIG. 1.

DESCRIPTION OF THE PREFERRED EMBODIMENT

Figure 1:
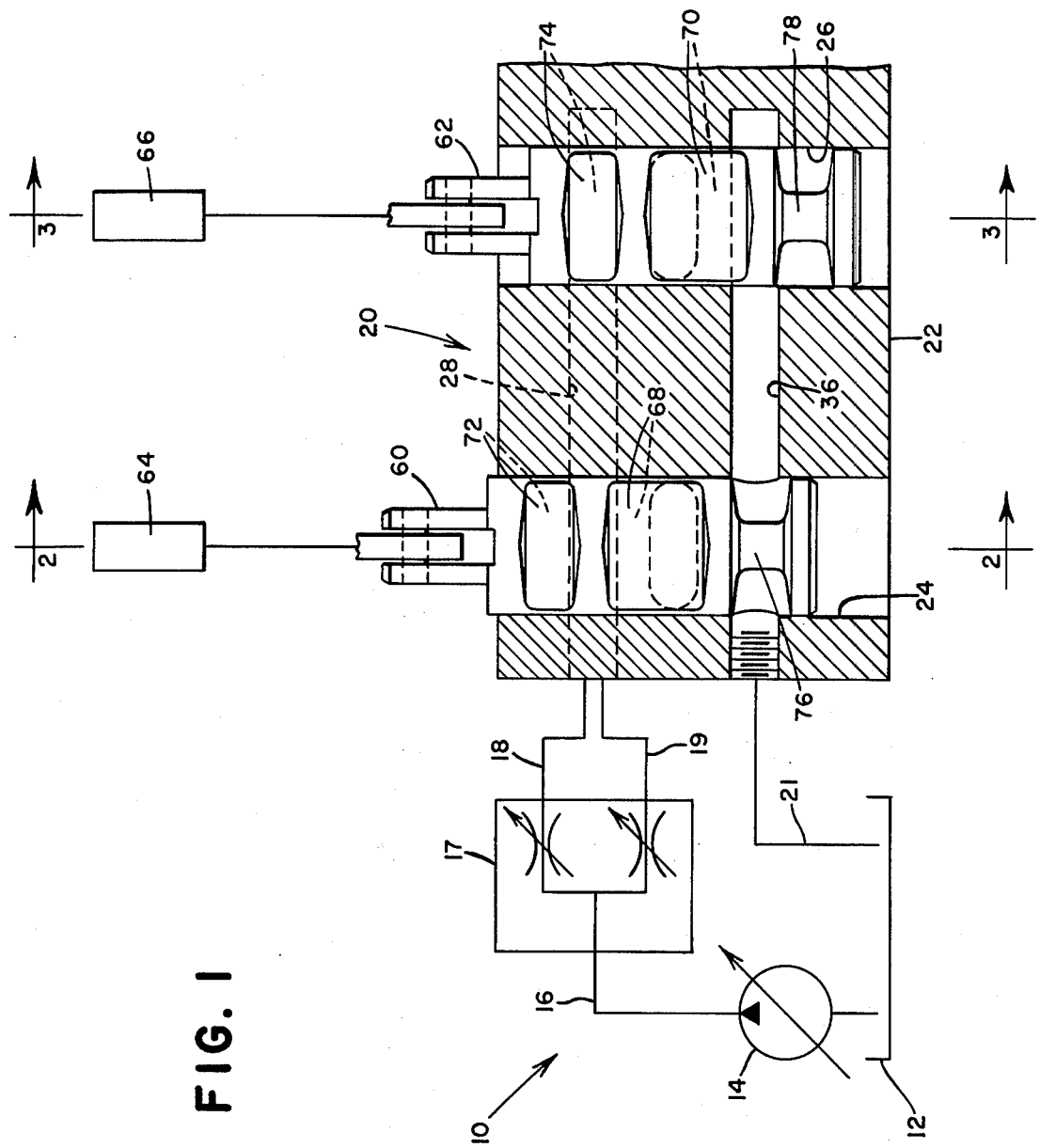
FIG. 1 is a schematic and sectional view showing a portion of a hydraulic control system in schematic and the control valve of the present invention in a sectional view taken along line 1—1 of FIG. 2.

In FIG. 1 of the drawings is a portion of a hydraulic system 10 including a reservoir 12 connected to a source of hydraulic power 14. The source 14 is connected by an inlet line 16 to a conventional flow dividing valve 17. The flow dividing valve 17 is connected by divided flow lines 18 and 19 to a dual flow control valve 20. The control valve 20 is connected to the reservoir 12 by an exhaust line 21.

The control valve 20 includes a valve body 22 with parallel through bores 24 and 26. As can be seen by reference to FIGS. 2 and 3 which show the remaining portion of the fluid system 10 connected to the control valve 20, parallel and coplanar first and second input pasages 28 and 30, connected respectively to the lines 18 and 19, intersect and straddle the bores 24 and 26. The exhaust line 21 is connected with an exhaust passage 36 which intersects the bores 24 and 26 below the input passages 28 and 30.

Positioned between the input passages 28 and 30 and the output passage 36 are co-linear first and second function passages 38 and 40 which intersect the bore 24. Coplanar with the function passages 38 and 40 are third and fourth function passages 42 and 44 which intersect with the bore 26.

The first function passage 38 is connected by a line 46 to a first port in the first of a pair of functions or reversible hydraulic wheel motors 48 and 50 and a line 52 connects a second port in the first hydraulic wheel motor 48 to the third function passage 42. A line 54 connects the second function passage 40 with a first port in the second hydraulic wheel motor 50 and a line 56 connects a second port in the hydraulic wheel motor 50 with the fourth function passage 44.

Referring again to FIG. 1, slidably inserted in the bores 24 and 26 are a pair of identical valve spools 60 and 62. The valve spools 60 and 62 are slidable in response to manual operators generally designated at 64 and 66, respectively. The valve spools 60 and 62 have a primary pair of opposed notches 68 and 70, respectively, and a secondary pair of opposed notches 72 and 74, respectively. The web portions of the value spools 60 and 62 between the opposed notches 68, 70, 72, and 74 are of sufficient diameter to seal off flow between the respective opposed notches. Below the opposed notches 68 and 70 are portions of reduced diameter designated by 76 and 78, respectively.

For forward operation of the hydraulic wheel motors 48 and 50, the valve spools 60 and 62 are positioned as shown in FIG. 1. The fluid from the source 14 is divided in the valve 17 and there are equal flows into the first and second input passages 28 and 30. With the valve spool 60 in the upper position, fluid flows from the first and second imput passages 28 and 30 into the first pair of opposed notches 68 where the division of fluid is maintained and out of the first and second function passages 38 and 40, respectively. The fluid flows through and differentially locks the hydraulic wheel motors 48 and 50 and, respectively, exhausts through the third and fourth function passages 42 and 44. With the valve spool 62 in the lower position, the fluid from the third and fourth function passages 42 and 44 passes around the area 78 into the exhaust passage 36 and to the reservoir 12 via the exhaust line 21.

For reverse operation, the positions of the valve spools 60 and 62 are reversed and the fluid flows from the source 14 into the first and second input passages 28 and 30 past the secondary opposed notches 72 of the valve spool 60 and through the primary opposed notches 70 in the valve spool 62 to the third and fourth function passages 42 and 44, respectively. The fluid then drives the hydraulic wheel motors 48 and 50 in reverse. The exhaust of fluid from the wheel motors 48 and 50 is through the first and second function passages 38 and 40, respectively, and into the primary opposed notches 68 and thence through the exhaust passage 36 and the exhaust line 21 to the reservoir 12.

It should be noted that when the valve spool 60 is in the lower position, the secondary opposed notches 72 are in line with the first and second input passages 28 and 30 and act to keep the fluid separated therebetween. At the same time the notches provided unrestricted flow along the first and second input passages 28 and 30 to the valve spool 62.

It should further be noted that when the valve spool 60 is in the raised position, the area of reduced cross-section 76 allows unrestricted flow from the valve spool 62 to the reservoir 12.

To stop the fluid wheel motors 48 and 50, both valve spools 60 and 62 are placed in their lowered position causing the source 14 to be blocked from the function passages 38, 40, 42, and 44.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. A valve comprising: a valve body having a plurality of bores provided therein; parallel and coplanar first and second input passage means intersecting and straddling all of the bores; a plurality of coplanar first function passage means each intersecting one of the bores adjacent and perpendicular to the first and second input passage means; a plurality of coplanar second function passage means each intersecting one of the bores and colinear with the first function means; exhaust passage means intersecting all the bores adjacent and perpendicular to the first and second function port means; and a plurality of spool means each received within and independently axially slidable in each of the bores between a first and second position; each of said spool means containing a pair of opposed notches therein; a first and a second of said opposed notches respectively connecting the first and second input passage means to the first and second function passage means when said spool means is in the first position and respectively connecting the first and second function passage means to the exhaust passage means when said spool means is in the second position.

2. The valve as claimed in claim 1 wherein each of said spool means includes a second pair of opposed notches adjacent the first pair of opposed notches; a first and second of said second pair of opposed notches respectively allowing unrestricted fluid flow along the first and second input passage means when said spool means is in the second position.

3. The valve as claimed in claim 2 wherein each of said spool means includes a portion of reduced diameter adjacent the first pair of opposed notches and opposite the second pair of opposed notches; said portion of reduced diameter allowing unrestricted fluid flow along the exhaust passage means when said spool means is in the first position.

4. A hydraulic system comprising: a source of pressurized fluid; flow dividing means connected to the source and having first and second output passage means; a valve body having first and second bores provided therein; said valve body having parallel and coplanar first and second input passage means intersecting and straddling the bores and respectively connected to the first and second output passage means; said valve body having coplanar first and second function passage means intersecting the first bore adjacent and perpendicular to the first and second input passage means; said valve body having coplanar third and fourth function passage means intersecting the second bore adjacent and perpendicular to the first and second input passage means; and said valve body having exhaust passage means connected to a fluid reservoir and intersecting the first and second bores adjacent and perpendicular to the function passage means; first line means connecting the first and third function passage means; second lines means connecting the second and fourth function passage means; first and second fluid motor means respectively disposed in the first and second line means; and first and second spool means respectively received within and independently axially slidable in the first and second bores between a first and a second position; said first spool means having a first pair of opposed notches provided therein; a first and a second of said first pair of opposed notches in said first spool means respectively connecting the first and second input passage means to the first and second function passage means when said first spool means is in the first position and respectively connecting the first and second function passage means to the exhaust passage means when said first spool means is in the second position; said second spool means having a first pair of opposed notches provided therein; a first and a second of said first pair of opposed notches in the second spool means respectively connecting the first and second input passage means to the third and fourth function passage means when said second spool means is in the first position and respectively connecting the third and fourth function passage means to the exhaust passage means when said second spool means is in the second position.

5. The hydraulic system as claimed in claim 4 wherein each of said spool means includes a second pair of opposed notches adjacent the first pair of opposed notches; a first and a second of said second pair of opposed notches respectively allowing unrestricted fluid flow along the first and second input passage means when said spool means is in the second position.

6. The hydraulic system as claimed in claim 5 wherein each of said spool means includes a portion of reduced diameter adjacent the first pair of opposed notches and opposite the second pair of opposed notches; said portion of reduced diameter allowing unrestricted fluid flow along the exhaust passage means when said spool means is in the first position.

* * * * *